Dec. 4, 1956     F. H. NEWMAN, JR     2,773,218

LIQUID DISPENSING MECHANISMS

Filed Sept. 29, 1952     2 Sheets-Sheet 1

INVENTOR.
Frederick H. Newman Jr.
BY
Morsell & Morsell
ATTORNEYS.

Dec. 4, 1956     F. H. NEWMAN, JR     2,773,218
LIQUID DISPENSING MECHANISMS
Filed Sept. 29, 1952     2 Sheets-Sheet 2
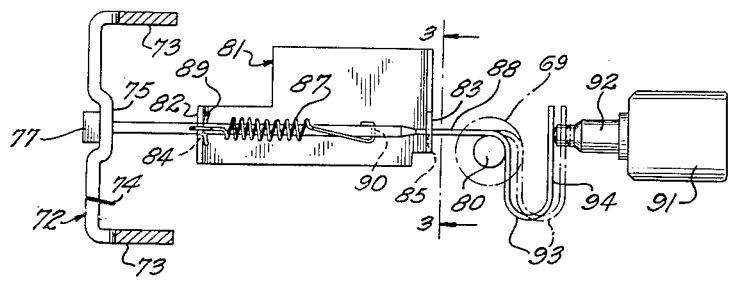
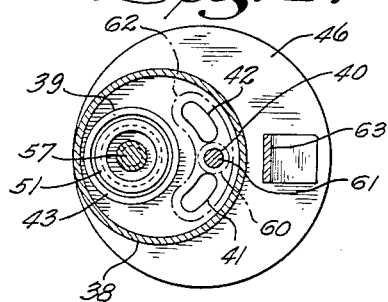 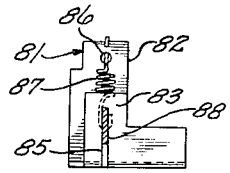
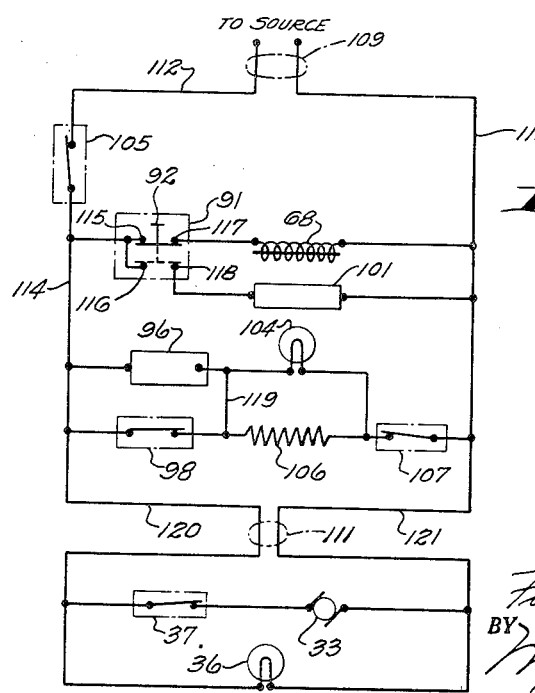

United States Patent Office 2,773,218
Patented Dec. 4, 1956

2,773,218

LIQUID DISPENSING MECHANISMS

Frederick H. Newman, Jr., Port Washington, Wis., assignor to Supurdisplay Incorporated, Milwaukee, Wis., a corporation of Wisconsin Application September 29, 1952, Serial No. 312,095

7 Claims. (Cl. 317—123)

This invention relates to improvements in liquid dispensing mechanisms, and more particularly to mechanisms for dispensing melted butter.

It is a general object of the present invention to provide an improved mechanism for dispensing accurately measured quantities of liquid, such as melted butter.

A further object of the invention is to provide an improved dispensing mechanism of the class described including an electrical circuit which actuates and controls the dispensing mechanism and also automatically records each dispensing cycle.

A further object of the invention is to provide an improved dispensing mechanism of the class described having a bowl equipped with a dispensing valve, said bowl being adapted to contain the liquid to be dispensed, and there being thermostatically controlled electrical heating means for said bowl to maintain the contents at a predetermined temperature.

A further object of the invention is to provide an improved dispensing mechanism of the class described wherein the bowl is normally closed by a hingedly mounted cover having motor-driven stirring mechanism normally extending into the bowl, there being a mercury switch in said cover connected in the power circuit to the stirring mechanism motor for automatically shutting off the power to said motor when the cover is raised.

A further object of the invention is to provide an improved dispensing mechanism of the class described wherein one actuation of the trigger bar causes one dispensing cycle, the time interval required for actuation of the dispensing valve by the actuating mechanism being sufficient to permit recording of said cycle by the counter mechanism.

A further object of the invention is to provide an improved dispensing mechanism of the class described which is positive and efficient in operation.

A further object of the invention is to provide an improved dispensing mechanism of the class described wherein all of the working parts are enclosed so that they cannot be tampered with.

With the above and other objects in view, the invention consists of the improved fluid dispensing mechanism, and all of its parts and combinations, as set forth in the claims, and all equivalents thereof.

In the drawings accompanying and forming a part of this specification, wherein one complete embodiment of the preferred form of the invention is shown, and wherein like characters of reference indicate the same parts in all of the views:

Fig. 2 is a sectional plan view taken approximately along the line 2—2 of Fig. 1;

Fig. 3 is a vertical sectional view taken approximately along the line 3—3 of Fig. 2;

Fig. 4 is a sectional plan view taken approximately along the line 4—4 of Fig. 1;

Fig. 5 is a wiring diagram of the electrical circuit of the improved fluid dispensing mechanism.

Figure 1:
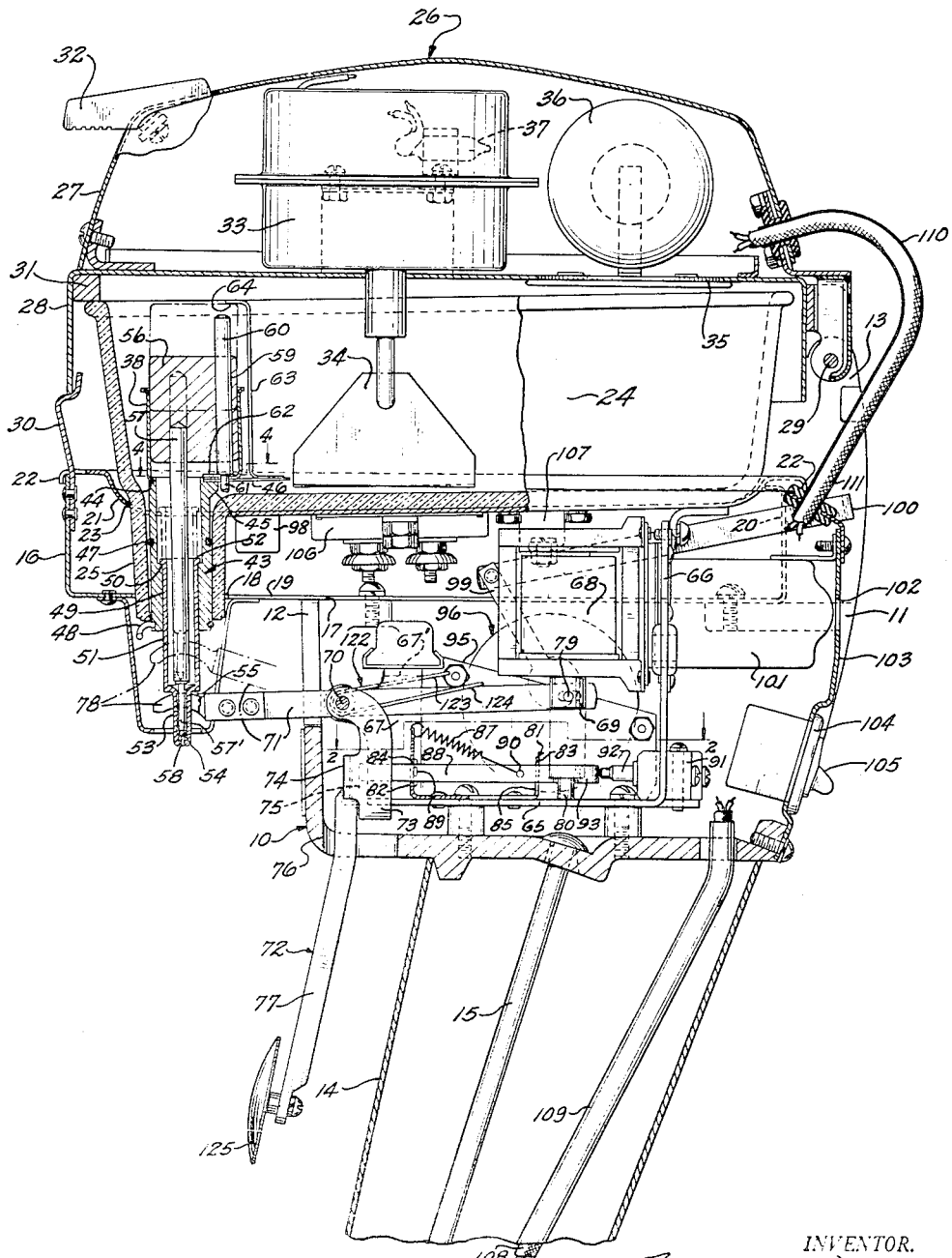
Fig. 1 is a fragmentary vertical sectional view of the improved fluid dispensing mechanism.

Referring more particularly to Fig. 1 of the drawings, the numeral 10 indicates a generally bowl-shaped housing which may taken the form of a casting, said housing having an open rear wall portion 11 and having an opposite wall portion formed with a slot 12 extending downwardly from the upper margin thereof. An upstanding ear 13 is formed on the housing 10 at each side of the wall opening 11, and said housing is positioned on a tubular column or pedestal 14 which, in turn, is positioned on a suitable base (not shown), said housing being connected to said base by means of an elongated bolt 15.

Positioned on the upper margin of the bowl 10 is a generally cylindrical pan 16 having a flat bottom wall formed with a relatively large circular opening 17 and with a relatively small circular opening 18 there being a slot 19 affording communication between the holes 17 and 18. A wall of the pan 16 is cut away at the rear as at 20 adjacent the open rear wall portion 11 of the housing 10, the cutaway portion 20 communicating with the opening 17 in the bottom of the pan.

A dished circular metal plate 21 is nested on the upper margin of the pan 16, said plate having a downturned peripheral flange 22 and being formed with a circular aperture 23 substantially coaxial with the aperture 18 in pan 16. A glass bowl 24 is positioned on the dished plate 21 and is formed with a tubular extension 25 which projects coaxially through the apertures 23 and 18.

A bowl cover 26, including a pair of fixed-together inverted bowl-shaped members 27 and 28, is hinged to the ears 13 of housing 10 at 29; the lower rim portion of the cover 26 which is opposite the hinge normally engaging a stop member 30 projecting upwardly from the periphery of the pan 16. Bowl member 28 carries a resilient bumper member 31 which normally rests on the lip of the glass bowl 24 above the stop member 30, as shown. The cover 26 can be raised on its hinge 29 by means of a handle 32 to expose the open upper portion of the bowl 24.

Mounted within the cover 26 is an electric motor 33 which may have suitable speed reducing gearing embodied therein, said motor being drivingly connected to a stirring paddle or blade 34 positioned in bowl 24. The horizontal wall of cover portion 28 is formed with an aperture 35, and mounted within cover portion 27 is an electric lamp 36 which is positioned to illuminate the bowl 24 and its contents through said aperture 35. The numeral 37 indicates a mercury switch in the power circuit to the motor 33, said switch being so mounted that its contacts are normally closed, being opened by raising of the cover 26. Switch 37, therefore, shuts off the flow of power to the motor 33 whenever the cover 26 is raised.

A cylindrical metering cup 38 is positioned in the bowl 24 above its bottom, the bottom of the cup being formed with an aperture 39 (see Fig. 4), with a smaller aperture 40, and with a pair of arcuate apertures or slots 41 and 42 one on each side of the aperture 40. A guide sleeve 43, positioned coaxially within tubular extension 25 of bowl 24, has its upper end formed with a portion of reduced external diameter to provide an annular shoulder 44, said sleeve having a portion 45 of increased external diameter below the shoulder 44 which is cut away at the side adjacent the wall of the bowl 24. A circular baffle plate 46 is formed with apertures which may be identical to and which are positioned to register with the apertures 39 to 42 of cup 38. Baffle plate 46 and cup 38 are preferably press-fitted over a portion of reduced diameter at the upper end of sleeve 43, sleeve 43 being received in aperture 39 of the cup as shown in Fig. 4. Thus, the sleeve 43 is in effect a tubular extension of the cup 38.

Intermediate its length, sleeve 43 may be formed with an annular groove for receiving an O ring 47 of rubber or other suitable material which sealingly engages the interior of the tubular extension 25 of bowl 24. At its lower end the sleeve 43 may be formed with an external annular groove for receiving a retaining clip 48. As shown in Fig. 1, the tubular extension 25 is preferably tapered. The sleeve 43 is formed with a portion 49 of reduced internal diameter to provide an internal annular shoulder 50. A cylindrical sleeve or spout 51 is telescopically slideable within the portion 49 of sleeve 43, and has an external annular flange 52 formed on its upper end, said flange being normally seated on the annular shoulder 50. The sleeve 51 has a lower end portion 53 of reduced internal and external diameter to form an external shoulder 55. At its lower tip sleeve 51 is formed with an internal annular valve seat 54.

A cylindrical piston 56 having substantial weight is axially slideably positioned in the cup 38, and a rod or stem 57 is fixed to said piston. The rod 57 extends coaxially within the sleeves 43 and 51 and has a lower end portion 57' of reduced diameter positioned within portion 53 of sleeve 51 and terminating in a conical end 58 which normally seats on the annular valve seat 54. The piston 56 is provided with a bore 59 in which is slideably positioned a cylindrical stem 60 having a lower end portion 61 of reduced diameter axially slideably positioned in the aperture 40 of cup 38, said portion serving as a pilot. Fixed on the portion 61 of stem 60 is an inlet check valve 62 shown in Fig. 1 and in dot and dash lines in Fig. 4, stem 60 also being shown in dot and dash lines in said figure. Fixed to the baffle plate 46 adjacent the cup 38 is a stop 63 having a horizontal upper end portion 64 which projects laterally over the upper end of stem 60 to limit the upward travel of said stem and valve plate 62.

Mounted within the frame 10, preferably in a position above the bottom wall thereof, is a chassis 65. Chassis 65 may take the form of a horizontal plate having a vertical plate portion 66 at one end and having a pair of spaced upstanding ears 67 adjacent the opposite end and adjacent the slot 12 in bowl 10. Ears 67 are formed with outturned flanges 67' at their upper ends. A solenoid 68 having a plunger 69 is mounted on plate portion 66 as shown in Fig. 1. The upstanding ears 67 carry a pivot pin 70 on which is pivotally mounted a lever 71 and a trigger bar 72, the former being mounted intermediate its length whereas the latter is connected at its upper end to the pin 70. The trigger bar 72 may take the form of a pair of arcuate arms 73 joined by a transverse web 74 (Fig. 2) the latter having an inwardly offset portion 75. A rod 77 which is connected to web 74 projects downwardly through a suitable aperture 76 formed in the bottom of bowl 10. The lower end of rod 77 is provided with a button 125 which is positioned for engagement by the container into which butter is to be dispensed.

The outer end of the lever 71 is bifurcated as at 78, and is positioned to embrace the portion 53 of sleeve 51 and to be engagable with the external annular shoulder 55 of said sleeve. The inner end of lever 71 is slotted to receive a pin 79 connecting said lever to solenoid plunger 69. A torsion spring 122 which is mounted on pin 70 has a pair of spaced arms 123 which engage ears 67, said spring also having a central arm 124 which urges the lever 71 in a clockwise direction about pin 70.

As shown in Fig. 1, solenoid plunger 69 is movable on a vertical axis, having a normal retracted or raised position as shown in solid lines in Fig. 1, as well as a projected or lowered position shown in dot and dash lines in said figure.

Mounted on chassis 65 coaxial with the solenoid plunger 69 is a plunger stop 80. A trigger blade bracket 81 is mounted on chassis 65 adjacent plunger stop 80, said bracket having spaced upstanding flanges 82 and 83. The flange 82 is formed with a vertical slot 84, and the flange 83 is formed with a slot 85 (see Fig. 3), the latter slot extending into the base of the bracket 81 as shown in Fig. 1. The flange 82 is also formed with an aperture 86 to receive one end of a tension spring 87. Positioned in the slots 84 and 85 is an elongated trigger blade 88. The blade 88 is transversely apertured to receive a cotter pin 89 which normally abuts flange 82, and said blade is also transversely apertured as at 90, to receive the other end of tension spring 87. As shown in Figs. 1 and 2, one end of the blade 88 normally abuts the portion 75 of trigger bar 72. The trigger blade 88 can slide axially in slot 84 and can move axially as well as downwardly in slot 85. The cotter pin 89 limits the movement of blade 88 to the left as viewed in Figs. 1 and 2, said blade being urged toward the left and upwardly by spring 87. Mounted on the chassis 65 in alignment with trigger blade 88 is a push-button type micro-switch 91, having a button or plunger 92 positioned for movement coaxial with blade 88, the axis of movement of said plunger and blade preferably being normal to the axis of movement of the solenoid plunger 69.

Referring to Fig. 2, the end of the trigger blade 88 adjacent the micro-switch 91 is formed with a transversely extending generally U-shaped portion 93 which terminates in a transversely extending deformable arm 94, the latter normally contacting the end of the switch plunger 92 as shown. As most clearly shown in Fig. 2, the plunger stop 80 is offset laterally from the blade 88, but said blade is in the path of movement of the solenoid plunger 69 indicated by the dot and dash lines in Fig. 2.

Fixed to one side of the chassis 65 is a vertical plate 95 on which a time switch 96 is mounted. Time switch 96 has normally open contacts, and is provided with a pivotally mounted arm 99 to which a manually engageable lever 100 is connected. By pulling the lever 100 to the right (Fig. 1) the contacts of switch 96 are closed, and the timing mechanism of said switch keeps said contacts closed for a predetermined period, preferably approximately four minutes. Mounted on the plate portion 66 of chassis 65 is an electric counter 101 having suitable indicia-bearing drums (not shown) which are visible through an opening 102 in a plate 103, the latter closing the open rear 11 of frame 10. Mounted in suitable apertures in plate 103 below the aperture 102 is a pilot light 104, and an on-and-off switch 105. Mounted on the underside of the plate 21 is an electrical resistance type heating element 106, a normally closed thermostatically controlled limit switch 107, and a thermostatically controlled switch 98.

Electric power enters the improved dispenser through a cable 108 entering the base (not shown) and passing upwardly through a conduit 109 in the column 14. In Fig. 1, no attempt is made to show the wires connected to the various parts of the mechanism, these connections being indicated in Fig. 5. The numeral 110 indicates a flexible tubular sheath through which a cable 111 passes from within the frame 10 to within the cover 26, thus making possible suitable connections with the motor 33, switch 37 and lamp 36.

Referring to Fig. 5, it will be noted that one wire 112 of the cable 108 is connected to one side of the on-off switch 105. The other wire 113 of cable 108 is connected to one side of the solenoid 68, to one side of the counter 101, and to one side of the thermostatically controlled limit switch 107. The other contact of switch 105 is connected by means of a conductor 114 to both contacts 115 and 116 on one side of the single-pole, double-throw micro-switch 91, as well as to one side of the time-controlled switch 96 and to one side of the thermostatically controlled switch 98.

The other side of the solenoid 68 is connected to the contact 117 of micro-switch 91, which is opposite to the contact 115, and the other side of the counter 101 is connected to the contact 118, which is opposite the contact 116 of micro-switch 91. A conductor 119 connects the other side of the time-controlled switch 96 to the other side of switch 98, one side of pilot light 104 and one side of the resistance heater 106 also being connected to conductor 119. The other side of pilot light 104 and of resistance heater 106 is connected to the other side of thermostatic limit switch 107. One wire 120 of cable 111 is connected to the wire 114, and the other wire 121 of cable 111 is connected to the wire 113. The wire 120 connects with one side of the mercury switch 37 and with one side of the lamp 36, and wire 121 connects with one side of the motor 33 as well as with the other side of the lamp 36. The other side of the mercury switch 37 connects with the other side of the motor 33 as shown.

Normally the switches 105, 98, 37 and 107 of the improved dispensing mechanism are closed, and switch 96 is open. The contents of the bowl 24 is kept heated to a predetermined temperature by the resistance element 106 under the control of thermostatic switch 98. While the element 106 is energized, the pilot light 104 is illuminated. When it is desired to have the resistance element 106 operate continuously for the predetermined period for which switch 96 is set, the contacts of the latter switch may be closed by pulling on the manually engageable handle 100. If for any reason the temperature of the bowl exceeds a predetermined maximum for safety, the thermostatically controlled limit switch 107 breaks the power circuit to the resistance element 106. The motor 33 is normally operating and is rotating stirring blade 34 continuously. The lamp 36 is normally illuminated and illuminates the bowl 24 through the aperture 35. Whenever the cover 25 is raised, however, the contacts of mercury switch 37 open to break the power circuit to the motor 33 and stop rotation of the stirring blade or paddle 34.

Solenoid 68 is normally energized by current flowing through the line 114 and through contacts 115 and 117 of switch 91. When, however, the plunger 92 is depressed to the position shown in dot and dash lines in Fig. 5, the power circuit to the solenoid 68 is broken, and current is delivered to the counter 101 from line 114 through contacts 116 and 118. Each time power is delivered to the counter 101 in this manner, the indicating drums thereof automatically record a dispensing cycle.

A dispensing cycle is begun by pressing the button 125 and trigger bar 72 inwardly (to the right in Fig. 1), thereby pushing trigger blade 88 axially to the right against the tension of spring 87. As the blade 87 is pushed toward the right, the arm 94 (Fig. 2) of blade 88 is bent toward the left by resistance to movement of spring-loaded plunger 92. Continued movement of the blade 88 to the right then depresses plunger 92, moving the contacts of switch 91 to the dot and dash line position of Fig. 5, energizing the counter 101 and deenergizing solenoid 68. Deenergization of solenoid 68 permits spring 122 to rotate lever 71 in a clockwise direction, thereby dropping plunger 69 onto the plunger stop 80. As the plunger 69 thus drops, it strikes the trigger blade 88 and pushes the right-hand end of said blade downwardly out of alignment with the end of depressed switch plunger 92, whereupon said plunger springs back toward the left to its normal undepressed state shown in Figs. 1 and 2.

As the plunger 92 moves toward the left, arm 94 of blade 88 springs toward the right to its normal undeformed condition, so that the blade 88 assumes the position shown in dot and dash lines in Fig. 2, wherein arm 94 engages the underside of plunger 92. As the plunger 92 thus returns to its normal position, the power circuit to solenoid 68 is again completed, thereby causing plunger 69 to be retracted to its normal raised position, pivoting lever 71 in a counterclockwise direction to its normal position.

After the plunger 69 has been raised, arm 94 remains in engagement with the side of switch plunger 92 until the pressure on trigger bar button 125 is released. When pressure on trigger button 125 is released the spring 87 pulls blade 88 to the left and upwardly to its position shown in Figs. 1 and 2, wherein blade arm 94 engages the end of switch plunger 91. The interval necessary for plunger 69 to fall into contact with stop 80 provides sufficient time for the counter 101 to be actuated as a result of closing of contacts 116 and 118. It will be noted that a new cycle of operation canot be started until the trigger bar 72 is released to again place trigger blade 88 in position for depressing engagement with the switch plunger 92.

Referring now to Figs. 1 and 4, when the lever 71 is pivoted in a clockwise direction by spring 122, the bifurcated end 78 of lever 71 lifts sleeve 51 to the dot and dash position of Fig. 1. Simultaneously, stem 57 and piston 56 are raised an equal amount by sleeve 51. As piston 56 is raised, inlet check valve 62 is lifted off of the apertures 41 and 42 in cup 38, and the pressure differential causes fluid, such as melted butter to flow from bowl 24 into the cup 38 below piston 56 through apertures 41 and 42. As valve 62 is thus lifted, stem 60 is also lifted, stop 64 limiting the upward movement of stem 60 to prevent pilot 61 at the lower end of said stem from leaving aperture 40. A measured quantity of melted butter is drawn into the cup 38 by each actuation of the sleeve 51. Baffle plate 46 serves as an anti-cavitation plate to prevent any air from being drawn into cup 38 through apertures 41 and 42.

When the lever 71 is again rotated in a counterclockwise direction by energization of solenoid 68, the bifurcated ends 78 drop to the solid line position of Fig. 1. Since the piston 56 has substantial weight, it settles in cup 38, thereby creating a pressure therebelow in said cup, which pressure closes valve 62 and forces melted butter from the cup 38 into the sleeve 43. This causes the sleeve 51 to drop rapidly until flange 52 rests on shoulder 50. As sleeve 51 drops, seat 54 moves away from the lower tip 58 of stem 57, and melted butter is forced out the spout 53 as the piston 56 settles into cup 38. Melted butter flows out of the spout 53 until the lower tip 58 of stem 57 moves into sealing engagement with the annular seal 54.

It is thus apparent that each time trigger bar 72 is moved to the right, a metered quantity of melted butter is dispensed through the spout 53, and the dispensing cycle is automatically recorded on the counter 101. The assembly can be quickly disassembled for cleaning purposes and meets the highest standards of sanitation.

Various changes and modifications can be made without departing from the spirit of the invention, and all of such changes are contemplated as may come within the scope of the claims.

What I claim is:

1. In combination a solenoid having a normally retracted plunger movable to a projected position; a power circuit for said solenoid; a pivotally mounted motion transmitting lever connected to said solenoid plunger; a switch connected in the power circuit to said solenoid to control the same and having a button movable on an axis normal to the axis of said plunger; and a trigger blade mounted for axial movement parallel with the axial movement of said switch button, said blade having a portion positioned to engage the end of said button whereby switch-button-depressing axial movement of said trigger blade causes projecting movement of said plunger, the mounting of said blade also permitting movement in a transverse plane parallel to the axis of said solenoid plunger, said blade being positioned in the path of movement of said solenoid plunger to be moved transversely by said plunger out of engagement with the end of said switch button when said plunger moves to projected position.

2. In combination a solenoid having a normally retracted plunger movable to a projected position; a power circuit for said solenoid; a motion-transmitting member connected to said solenoid plunger; a switch connected in the power circuit to said solenoid to control the same and having a button movable on an axis normal to the axis of said plunger; a trigger blade mounted for axial movement parallel with the axial movement of said switch button, said blade having a portion positioned to engage the end of said button, the mounting of said blade also permitting movement in a transverse plane parallel to the axis of said solenoid plunger, said blade being positioned in the path of movement of said solenoid plunger when the latter moves in a projecting direction and being moved transversely by said plunger out of engagement with the end of said switch button when said plunger moves to projected position; and a movably mounted tripping bar positioned for engagement with said trigger blade when moved in one direction to cause switch-button-depressing axial movement of said trigger blade, whereby movement of said tripping bar causes projecting movement of said plunger and transverse movement of said trigger blade out of depressing engagement with said switch button.

3. In combination a solenoid having a normally retracted plunger movable to a projected position; a power circuit for said solenoid; a motion transmitting member connected to said solenoid plunger; a push button switch connected in the power circuit to said solenoid to control the same and having a button movable on an axis normal to the axis of said plunger; a trigger blade mounted for axial movement parallel with the axial movement of said switch button, said blade having a portion positioned to engage the end of said button, the mounting of said blade also permitting movement in a transverse plane parallel to the axis of said solenoid plunger, said blade being positioned in the path of movement of said solenoid plunger when the latter moves in a projecting direction and being moved transversely by said plunger out of engagement with the end of said switch button when said plunger moves to projected position; and spring means urging said trigger blade axially away from said switch button and transversely toward said solenoid plunger, whereby switch-button-depressing axial movement of said trigger blade causes projecting movement of said plunger and transverse movement of said trigger blade out of depressing engagement with said switch button to a position wherein said spring means urges return of said blade to its normal position.

4. In combination a normally energized solenoid having a normally retracted plunger movable to a projected position; a power circuit for said solenoid; a motion transmitting member connected to said solenoid plunger; a normally closed push button switch connected in the power circuit to said solenoid to control the same and having a button movable on an axis normal to the axis of said plunger; a trigger blade mounted for axial movement parallel with the axial movement of said switch button, said blade having a portion positioned to engage the end of said button, the mounting of said blade also permitting movement in a transverse plane parallel to the axis of said solenoid plunger, said blade being positioned in the path of movement of said solenoid plunger when the latter moves in a projecting direction and being moved transversely by said plunger out of engagement with the end of said switch button when said plunger moves to projected position, whereby switch-button-depressing axial movement of said trigger blade causes projecting movement of said plunger and transverse movement of said trigger blade out of depressing engagement with said switch button.

5. In combination a normally energized solenoid having a normally retracted plunger movable to a projected position; a power circuit for said solenoid; a motion transmitting member connected to said solenoid plunger; spring means urging said plunger toward projected position; a normally closed push button switch connected in the power circuit to said solenoid to control the same and having a button movable on an axis normal to the axis of said plunger; a trigger blade mounted for axial movement parallel with the axial movement of said switch button, said blade having a portion positioned to engage the end of said button, the mounting of said blade also permitting movement in a transverse plane parallel to the axis of said solenoid plunger, said blade being positioned in the path of movement of said solenoid plunger when the latter is moved in a projecting direction and being moved transversely by said plunger out of engagement with the end of said switch button when said plunger moves to projected position; and spring means urging said trigger blade axially away from said switch button and transversely toward said solenoid plunger, whereby switch-button-depressing axial movement of said trigger blade causes projecting movement of said plunger and transverse movement of said trigger blade out of depressing engagement with said switch button to a position wherein said spring means urges return of said blade to its normal position.

6. In combination a solenoid having a normally retracted plunger movable to a projected position; a power circuit for said solenoid; a motion transmitting member connected to said solenoid plunger; a push button switch connected in the power circuit to said solenoid to control the same and having a button movable on an axis normal to the axis of said plunger; a trigger blade mounted for axial movement parallel with the axial movement of said switch button, said blade having a yielding, transversely extending end portion positioned to engage the end of said button whereby switch-button-depressing axial movement of said trigger blade causes yielding of said blade end portion, the mounting of said blade also permitting movement in a transverse plane parallel to the axis of said solenoid plunger, said blade being positioned in the path of movement of said solenoid plunger when the latter moves in a projecting direction and being moved transversely by said plunger out of engagement with the end of said switch button when said plunger moves to projected position, projecting movement of said plunger and transverse movement of said trigger blade out of depressing engagement with said switch button permitting said yielding blade end portion to expand.

7. In combination, a solenoid having a normally retracted plunger movable to a projected position; means including an electrical power circuit for energizing said solenoid; motion transmitting mechanism connected to said solenoid plunger; a push button switch connected in said power circuit to said solenoid to control the same and having a button movable on an axis normal to the axis of said plunger; a trigger blade mounted for axial movement parallel with the axis movement of said switch button to depress the latter, said blade having a yielding, transversely extending end portion positioned to engage the end of said button whereby switch-button-depressing axial movement of said trigger blade causes yielding of said blade end portion while the button is held in depressed condition, the mounting of said blade also permitting movement in a transverse plane parallel to the axis of said solenoid plunger, said blade being positioned in the path of movement of said solenoid plunger to be moved transversely by said plunger out of engagement with the end of said switch button when said plunger moves to projected position, thereby permitting said blade end portion to return to its normal state on the side of said released button opposite said plunger.

References Cited in the file of this patent

UNITED STATES PATENTS

| 1,157,860 | Gage | Oct. 26, 1915 |
| 1,273,390 | Lundgren | July 23, 1918 |
| 2,103,868 | Perry | Dec. 28, 1937 |
| 2,169,454 | Titus | Aug. 15, 1939 |
| 2,619,986 | Goepfrich | Dec. 2, 1952 |
| 2,630,139 | Nagel | Mar. 3, 1953 |